US006954550B2

(12) United States Patent
Fujieda

(10) Patent No.: US 6,954,550 B2
(45) Date of Patent: Oct. 11, 2005

(54) IMAGE PROCESSING METHOD AND APPARATUS

(75) Inventor: Shiro Fujieda, Kyoto (JP)

(73) Assignee: Omron Corporation, Kyoto (JP)

( * ) Notice: Subject to any disclaimer, the term of this patent is extended or adjusted under 35 U.S.C. 154(b) by 707 days.

(21) Appl. No.: 09/996,417

(22) Filed: Nov. 28, 2001

(65) Prior Publication Data

US 2002/0063893 A1 May 30, 2002

(30) Foreign Application Priority Data

Nov. 29, 2000  (JP) ........................................ 2000-362159

(51) Int. Cl.[7] ................................................ G06K 9/48
(52) U.S. Cl. ........................ 382/199; 382/180; 382/190
(58) Field of Search ................................ 382/103, 149, 382/171, 180, 190, 195, 197, 199, 202, 203, 216, 266, 273

(56) References Cited

U.S. PATENT DOCUMENTS

| | | | | |
|---|---|---|---|---|
| 4,887,302 | A | * 12/1989 | Urushibata | 382/180 |
| 5,081,689 | A | * 1/1992 | Meyer et al. | 382/199 |
| 5,987,173 | A | * 11/1999 | Kohno et al. | 382/199 |
| 6,453,069 | B1 | * 9/2002 | Matsugu et al. | 382/173 |
| 6,754,385 | B2 | * 6/2004 | Katsuyama | 382/171 |
| 6,766,055 | B2 | * 7/2004 | Matsugu et al. | 382/173 |
| 6,788,817 | B1 | * 9/2004 | Saka et al. | 382/199 |

FOREIGN PATENT DOCUMENTS

| | | |
|---|---|---|
| JP | 5-165967 | 7/1993 |
| JP | 6-76035 | 3/1994 |
| JP | 8-161493 | 6/1996 |
| JP | 8-315135 | 11/1996 |
| JP | 9-54892 | 2/1997 |
| JP | 9-204419 | 8/1997 |
| JP | 11-195127 | 7/1999 |
| JP | 11-232382 | 8/1999 |

OTHER PUBLICATIONS

Venkateswar, et al. "Extraction of straight lines in Aerial Images", IEEE, pp. 1111–1114, 1992.*
Regier "An Approach to Line Labeling Using Markov Random Fields", IEEE, pp. 514–522, 1991.*
Office Action from Japan Patent Office, Japan Application No. 2001-360985, date mailed Nov. 30, 2004. (Non--English document).

* cited by examiner

Primary Examiner—Daniel Mariam
(74) Attorney, Agent, or Firm—Beyer Weaver & Thomas LLP

(57) ABSTRACT

After a variable-density image of a target object is inputted and edge pixels representing the contour line of the target object are extracted from the image, the directions of these edge pixels are calculated, while straight-line portions in the contour are labeled according to their directions. Those of the edge pixels, which have the same direction as that of any of the straight-line portions, are assigned the same label. Line segments are then extracted as assemblies of those of the edge pixels which are continuous on the image and have a same assigned label. For labeling the directions of the straight-line portions, a histogram may be prepared, based on the numbers of edge pixels having different directions. Peaks are then extracted from the histogram and the labels are set to the directions corresponding to these peaks. Alternatively, labels may be set to each of expected directions of straight-line portions of the contour of the target object, the same labels being assigned to edge pixels having the same direction.

34 Claims, 7 Drawing Sheets

IMAGE PROCESSING METHOD AND APPARATUS

BACKGROUND OF THE INVENTION

This invention is in the technical field of image processing by means of a computer and relates in particular to methods and apparatus for measuring the position and orientation of a target object with a contour containing straight lines and inspecting whether there is a defect in the contour.

When the position and orientation of an object are observed or defects on its contour are being inspected on a variable-density image, there are situations in which it becomes desirable to extract straight-line portions from the contour of the target object. Conventional methods of extracting the contour of a target object include those by binary representation of the image, those based on the magnitude of the density gradient and those using an expanded or contracted image.

By a binary representation method, an image is divided into areas with white and black pixels and a contour line is formed by the pixels located at their boundary. By a method depending on the density gradient, the density gradient at each pixel is calculated and a contour line is formed by those of the pixels at which the density gradient exceeds a specified threshold value. By a method using an expanded or contracted image, an expanded image and a contracted image are formed by expanding the contracting the bright area of the original image and a contour line is extracted by producing a differential image therefrom.

By any of these methods, what is extracted is the contour line as a whole, and none of them can be used to extract only straight-line portions of the contour. In order to extract a straight-line portion of the contour line, it may be attempted to evaluate the connection pattern of the pixels forming the contour line and to identify the portions which may each be considered to represent a straight line, for example, by considering the pixels on the contour line sequentially to examine whether they are connected in a same direction. If it is attempted to improve the resolution of connection direction, however, an average of directions of connection of several pixels must be considered and hence very small defects which interrupt the connection will have to be ignored. If the contour lines are extracted so as to have a finite width, furthermore, it is difficult enough to establish an algorithm for extracting a straight line.

By any of these prior art methods, furthermore, the characteristics of a contour line (such as its width and position, as well as the sizes of protrusions and indentations thereon) will change, depending on the conditions of the image (such as the difference in density between the background and the target object and the uniformity in brightness). It is therefore difficult to dependably extract a straight-line portion of a contour line by any of these methods relying on evaluation of the connection pattern of pixels.

SUMMARY OF THE INVENTION

It is therefore an object of this invention to accurately and speedily extract a straight-line portion of the contour line of a target object on a variable-density image.

It is another object of this invention to accurately extract a straight-line portion of a target object, independent of the conditions of the image even where the density difference is small between the background and the target object or where the lighting condition is not uniform.

It is a further object of this invention to measure the position or orientation of a target object or to extract a defect on the contour of a target object on the basis of straight lines extracted from the contour of the target object.

For processing a variable-density image of a target object having a contour which is represented by edge pixels and includes straight-line portions according to this invention, the following steps are sequentially carried out: (1) line labeling step of setting a different one of labels to each of the directions of the straight-line portions, (2) pixel labeling step of assigning to those edge pixels which have the same direction as one of the different directions of the straight-line portions the same label assigned to the corresponding one of the different directions of the straight-line portions, and (3) line segment extracting step of extracting, as a line segment, an assembly consisting of those of the edge pixels which are continuous on the image and have the same label assigned thereto. Those of the pixels forming the contour line of a target object on a variable-density image are herein referred to as "edge pixels". The contour line need not have a width of one pixel. It may contain a plurality of edge pixels in the direction of its width.

One of convenient methods of extracting edge pixels is to select those of the pixels at which the density gradient of the image is greater than a specified threshold value. Not all of the pixels extracted by such a method need be finally defined as the edge pixels. A thinning process for thinning a line including all of those pixels initially extracted as edge pixels may be carried out to make the contour line thinner and only those pixels forming such a thinned contour line may be referred to as edge pixels. On the other hand, the concept of density gradient may be ignored in extracting edge pixels, say, by extracting only those pixels corresponding to a boundary line on a binary image with only white and black regions. No matter how edge pixels are extracted, however, those pixels at which the density gradient is relatively large are extracted as edge pixels.

The direction of an edge pixel may be defined in different ways. It is normally defined as the direction perpendicular to the direction of the density gradient at its position because it is convenient, if not strictly necessary, to define the direction of an edge pixel to be the same as the direction of a straight-line portion which contains this edge pixel. In other words, if the direction of a straight-line portion is defined to be the direction perpendicular to the direction of its extension, although it is contrary to or at least different from the conventional definition, the direction of an edge pixel may be accordingly defined, for the purpose of this invention, to be the same as the direction of the density gradient at the pixel. For the convenience of disclosure, however, the direction of an edge pixel will be defined hereinafter as the direction perpendicular to the density gradient at the position of the pixel. The direction of a straight-line portion and that of the edge pixels contained therein need not be exactly the same. In the description of the present invention, their difference is required only to be smaller than by a value specified according to the purpose of the image processing.

When two pixels are said to be continuous or in a continuing relationship, it does not necessarily mean that there are no other pixels between them. It generally means that they satisfy a neighborhood condition specified particularly for the analysis. The so-called four-neighbor condition by which two pixels are connected only if they are next to each other in the horizontal or vertical direction and the so-called eight-neighbor condition by which the four diagonal directions are added to the four-neighbor condition are frequently adopted, but the scope of the neighborhood may be defined more broadly.

In this invention, it is noted that directions of edge pixels can be determined with high accuracy because the density gradient is relatively large at their positions. Thus, line segments are represented as assemblies of edge pixels extracted on the conditions that they have a common label assigned according to their directions and that they are continuous and hence straight-line portions of the contour of a target object on an image can be extracted reliably. Moreover, since the directions of edge pixels can be extracted dependably without regard to the condition of the variable-density image or even where the difference in density between the background and the target object is small or the condition of illumination is not uniform, such straight-line portions can be extracted correctly even under such conditions.

Each of the steps in the method of this invention may be carried out either on a given variable-density image as a whole or by specifying an area of measurement on such an image and only on the specified area.

In the aforementioned line labeling step, labels may be each set to one of the directions of straight-line portions contained in the contour of the target object by carrying out (1a) a histogram making step of preparing a histogram from the numbers of edge pixels having different directions and (1b) a peak label setting step of extracting peaks from this histogram and setting a different label to each of the directions of edge pixels corresponding to a different one of the extracted peaks. In the aforementioned pixel labeling step, each of the different labels set in the peak label setting step is assigned to each of the edge pixels having the corresponding direction. Such a histogram may be made to directly show the numbers themselves of the edge pixels having different directions or by multiplying such numbers with a weight factor such as representing the density gradient at the position of the corresponding edge pixels.

The direction of edge pixels corresponding to a peak may mean the direction of the edge pixels in the corresponding one of the divisions of the histogram or the directions of the edge pixels in a plurality of divisions including those proximal to the corresponding division. Thus, straight-line portions can be extracted from the contour of the target object even if they have any of these directions or even if their directions are not preliminarily known. The extraction of the peaks may be carried out according to a specified criterion such that the tallest peak and a given number of next tallest peaks or all peaks taller than a specified threshold height may be extracted.

If the line segments extracted in the aforementioned line segment extracting step include a pair with a positional displacement smaller than a specified maximum displacement value and a directional difference smaller than a specified maximum directional difference value, such a pair may be unified into a single unified segment. Even if a line segment is divided into two parts by a cut or a protrusion on the contour, the two parts can thus be unified back into a single line segment. Thus, the position and orientation of a target object, even if it has such a cut or a protrusion on its contour, can be accurately measured.

The method may further include a selecting step of selecting, from the extracted line segments in the aforementioned extracting step and from the unified line segments in the unifying step, those of the line segments satisfying specified line segment selecting conditions such that line segments appropriate for the image processing under such specified conditions can be obtained. The conditions for extracting line segments may relate to the range in their lengths, the range in angles they make with a standard direction, the range in the positions, the range in the distance between their end positions, the range in the angle between two line segments and the order of their lengths. The method may also include a display step of displaying on the variable-density image in a distinguishable form positions of the line segments or the crossing points of extensions of a plurality of line segments selected in the selecting step such that the conditions of extraction and selection of line segments can be clearly shown to the user. By observing such a display, the user can ascertain whether or not intended positions such as a corner of the target object has been correctly selected in an area of measurement.

According to another embodiment of the invention, a defect detecting step may be carried out to determine whether a defect is present or absent in straight-line portions of the contour of the target object from the manners in which the line segments are extracted in the aforementioned line segment extracting step. According to this invention, line segments are extracted on the basis of the continuity of edge pixels having directions which may be considered equal. Since the directions of edge pixels change significantly by the presence of even a small defect of only a few pixels in the contour, even such small defects can be detected with a high level of accuracy.

For example, if there is a pair of line segments among the line segments extracted in the line segment extracting step between which the difference in direction is within a specified range and the positional displacement is also within a specified limit, it may be concluded that there is a defect between such pair of line segments. As another example, it may be concluded that there is a defect in a straight-line portion of the contour of a target object by comparing the number of line segments extracted in the line segment extracting step with a specified standard value and if they are different and do not match.

According to another embodiment of the invention, the aforementioned line labeling step is carried out by setting a different label to each of expected directions of straight-line portions of the contour of the target object and the aforementioned pixel labeling step is carried out by assigning the same label to those of the edge pixels having the corresponding one of the expected directions. When the directions of straight-line portions of the contour of a target object can be expected such as when the orientation of the target object is fixed, the process can be carried out speedily because individual labels can be set without making a histogram for each variable-density image to be analyzed. A method according to this embodiment may also be used for determining whether the target object may pass as a product without a defect or for classifying the target objects, into categories on the basis of the determination whether the contour of the tested target object contains straight-line portions in expected directions.

An image processing apparatus embodying this invention may be characterized as comprising image inputting means for inputting a variable-density image of a target object having a contour, edge pixel extracting means for extracting edge pixels contained in this image, orienting means for calculating the directions of these extracted edge pixels, direction setting means for setting directions of straight-line portions contained in the contour; and means for carrying out the aforementioned line labeling, pixel labeling and line segment extracting steps. With an apparatus thus structured, edge pixels are extracted from an inputted variable-density image and their directions are obtained. On the other hand, labels are individually set for each of the directions of straight-line portions of the contour of a target object. Those of the edge pixels with a direction matching any of the directions of the straight-line portions are assigned the label for the straight-line portions of the matching direction. Assemblies of edge pixels having the same label assigned and being continuous are then extracted as line segments. Thus, straight-line portions of the contour of a target object can be extracted accurately.

The image input means is connected to an image generating device such as a camera or a scanner and is adapted to take in a variable-density image obtained thereby. It may comprise an interface circuit or an A/D conversion circuit. For the purpose of inputting an image, it may be composed of a circuit for receiving an image transmitted through telecommunication lines or a reading device for reading an image stored in a memory medium.

Many of the "means" contained in an apparatus as described above may be realized in the form of computer hardware and software for operating it. Some of them may be formed in the form of a circuit block such as ASIC (application specific integrated circuit) with a computer controlling the coordinated operations of the circuit blocks.

A filter for extraction of edge pixels such as a Sobel filter may be used as the edge pixel extracting means and the orienting means. In addition, various methods of extracting a contour may be carried out on the image memory of a computer.

According to an embodiment of the invention, the aforementioned direction setting means may comprise histogram making means for preparing a histogram from numbers of edge pixels having different directions and peak label extracting means for extracting peaks from this histogram. A line labeling means sets a different label to each of the directions of edge pixels corresponding to a different one of the extracted peaks, and each of these different labels is assigned by a pixel labeling means to each of the edge pixels having the direction corresponding thereto.

Various means such as unifying means, selecting means, display means and defect detecting means for respectively carrying out the aforementioned unifying, selecting, display and defect determining steps may be included in an apparatus embodying this invention.

According to another embodiment of the invention, the aforementioned direction setting means inputs expected directions of the straight-line portions of the contour of the target object, the line labeling means sets a different one of the labels to each of the expected directions inputted by the direction setting means, and the pixel labeling means assigns these labels to those of the edge pixels having one of the expected directions inputted by the direction setting means.

DETAILED DESCRIPTION OF THE INVENTION

Figure 1:
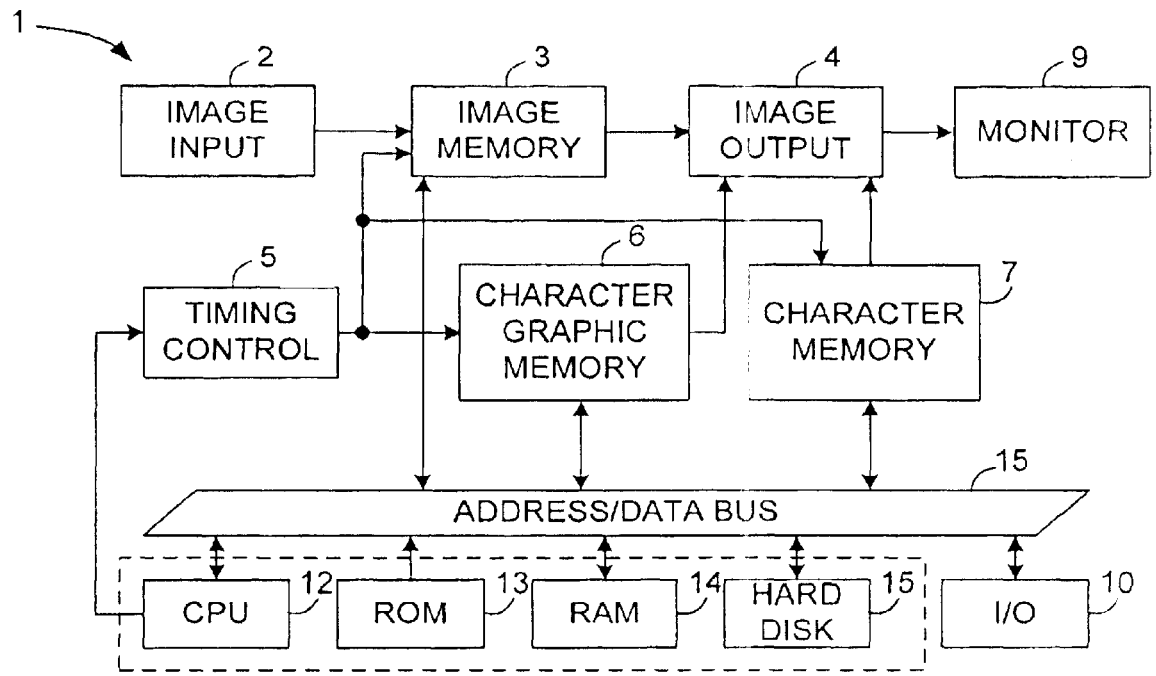
FIG. 1 is a block diagram of an image processing apparatus embodying this invention.

FIG. 1 shows the structure of an image processing apparatus 1 embodying this invention for extracting on a digital variable-density image (hereinafter simply referred to as the image) straight-line portions on the contour of a target object and, if there are a plurality of such straight-line portions, the crossing points of the extensions of these straight-line portions. The apparatus 1 is composed of an image input device 2, an image memory 3, an image output device 4, a timing controller 5, a character-graphic memory 6, a character memory 7, a control unit 8, a monitor 9 and an I/O port 10.

The image input device 2 is composed of an interface circuit for receiving variable-density image signals from an analog camera (not shown), an A/D converter circuit for converting the variable-density image signals received by the interface circuit into digital signals, and a filter circuit for cutting noise. The invention, however, is not limited to the use of an analog camera. A digital camera may be used within the scope of the invention.

The image memory 3 serves to receive the digital variable-density image data received by the image input device 2 and A/D converted and to store them. The character-graphic memory 6 stores image data necessary for the display of histograms, results of processing and screens for setting conditions for the extraction of line segments, to be explained below.

The character memory 7 stores test data for displaying character data such as inspection results and the positions of display. These memory devices 3, 6 and 7 are individually connected to the control unit 8 through an address/data bus 11 and serve to output data to the image output device 4 or to the address/data bus 11 in response to requests from the control unit 8 and according to timing signals from the timing controller 5.

The control unit 8 is composed mainly of a CPU 12, a ROM 13 and a RAM 14 and is also provided with a hard disk 15 having installed thereon a control program for showing an inspection process routine. The CPU 12 serves to carry out a desired measurement process on the basis of the control program on the hard disk 15 by reading and writing various data from and in each memory through the address/data bus 11.

The image output device 4 serves to transmit not only an image of a target object to be inspected but also histograms, processed images and character data for showing the results of an inspection to the monitor 9 either singly or in a synthesized form and have them displayed on a screen. The I/O port is connected to an input device such as a keyboard and a mouse and an output device such as an external memory device and a transmitting device and is used when receiving various set data from the input device and transmitting out results of an inspection.

The image processing apparatus 1 as shown above is designed not only to set an area of measurement on an inputted image including a target object of inspection but also to receive, through the I/O port 10, inputted data which characterize the line segments forming the contour of the target object, to be used as conditions of their extraction. Such an area of measurement is selected according to a preliminarily set conditions but a desired area of a desired size may be selected at any desired position by the user's operations every time a new image is inputted. An inputted image may be entirely selected as the area of measurement.

Figure 2:
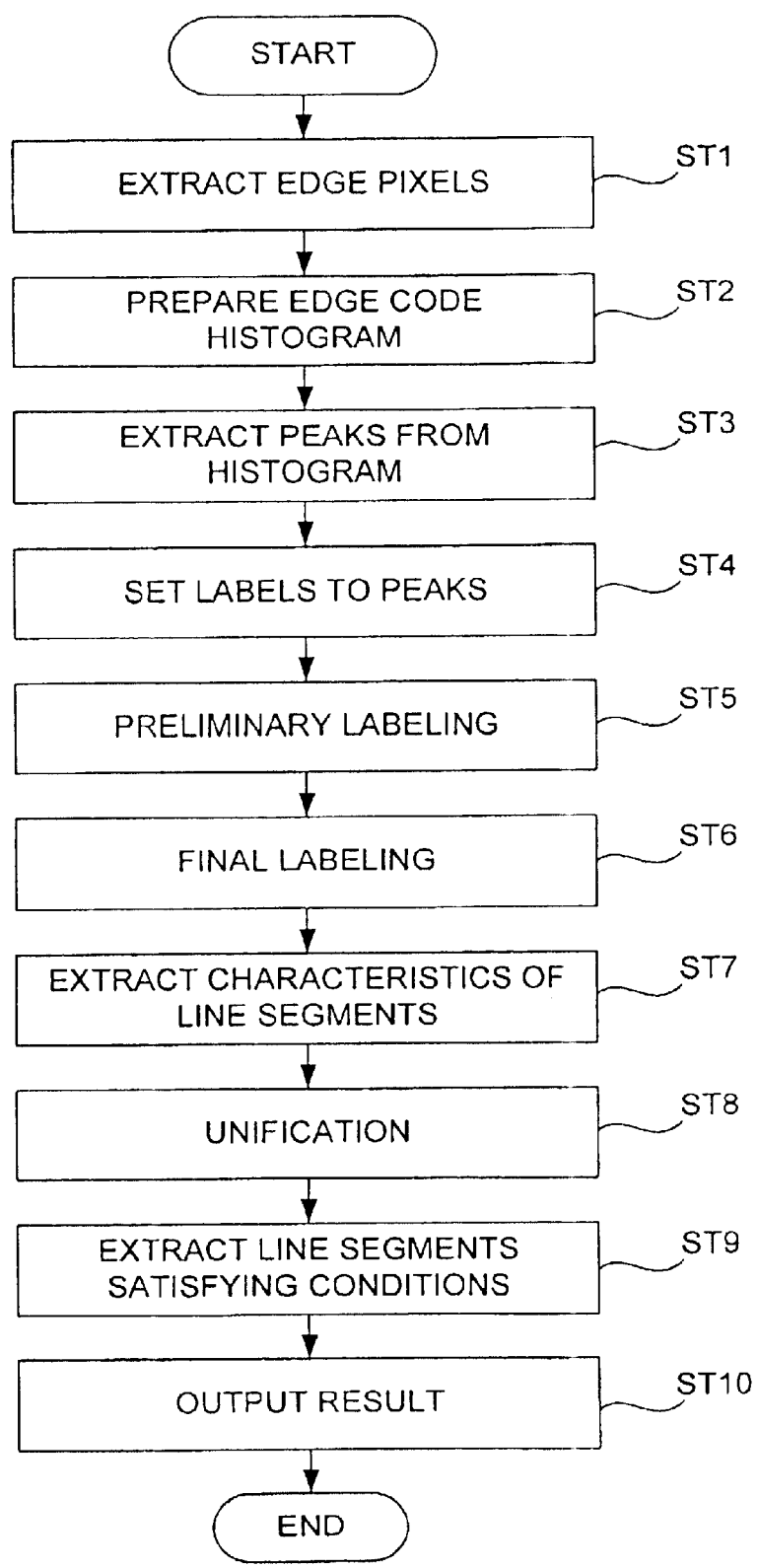
FIG. 2 is a flowchart of an image processing process.

FIG. 2 shows a series of measurement processes carried out by the image processing apparatus 1. The processes will be explained next sequentially according to FIG. 2 and by referencing FIGS. 3–14.

Figure 3:
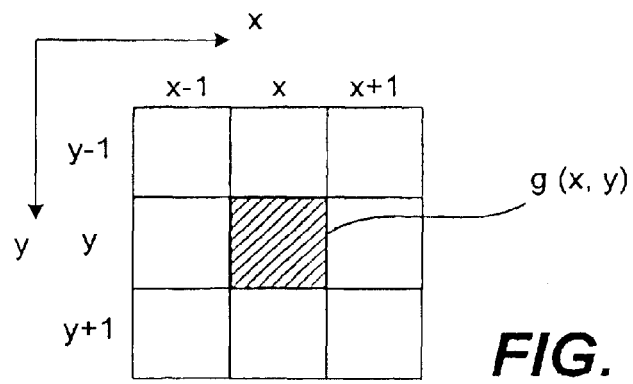
FIG. 3 shows a mask for extracting edge pixels.

In the first step (Step ST1), what are herein referred to as the edge pixels are extracted. This is done by scanning the image with a 3×3 mask as shown in FIG. 3 and calculating at each of the scanned positions the density gradients $Ex(x,y)$ and $Ey(x,y)$ in the x-direction and the y-direction on the image and the magnitude of the density gradient (hereinafter referred to as the edge intensity $Ei(x,y)$) at the position of the center pixel g at coordinates (x,y). If the value of this edge intensity $Ei(x,y)$ exceeds a specified threshold value, the corresponding pixel g is identified as an edge pixel. The density gradients $Ex(x,y)$ and $Ey(x,y)$ are calculated as follows:

$Ex(x,y)=\{I(x+1,y-1)+2I(x+1,y)+I(x+1,y+1)\}-\{I(x-1,y-1)+2I(x-1,y)+I(x-1,y+1)\}$, $Ey(x,y)=\{I(x-1,y+1)+2I(x,y+1)+I(x+1,y+1)\}-\{I(x-1,y-1)+2I(x,y-1)+I(x+1,y-1)\}$, where I (x,y) indicates the image density value at the position (x,y), and $Ei(x,y)=\{(Ex(x,y))^2+(Ey(x,y))^2\}^{1/2}$ If a simplified expression suited for a high-speed operation is desired, the expression for $Ei(x,y)$ may be replaced by the following:

$Ei(x,y)=Ex(x,y)+Ey(x,y)$.

According to the example being described, the scanning of the mask is carried out by a software operation, as will be explained more in detail below, but this is not intended to limit the scope of the invention. A differential circuit for this particular application may be used to carry out the extraction of edge pixels in parallel with the input of an image into the image memory 3 and also to carry out the processes to be described below by using the extracted edge pixels.

The density gradients $Ex(x,y)$ and $Ey(x,y)$ are indicative of the x-component and the y-component respectively of the rate of change in the density at the position of the pixel g at position (x,y) and the edge intensity $Ei(x,y)$ may be said to be the length of the vector which is the vector sum of the two vectors along the x-axis and the y-axis with length given by $Ex(x,y)$ and $Ey(x,y)$, respectively. As explained above, edge pixels are those of the pixels of the image at which the magnitude of $Ei(x,y)$ exceeds a certain threshold value, and the direction of the sum vector represented by $Ei(x,y)$ is the direction in which the density on the image changes, or the direction of the density gradient.

In Step ST2, the direction of each edge pixel extracted in Step ST1 is calculated. The angle which represents the direction of each edge pixel as numerical information is herein referred to as the edge code. The number of edge pixels extracted within a specified area of measurement is calculated according to their edge codes and a histogram is thus prepared. This histogram is herein referred to as the edge code histogram.

Figure 4:
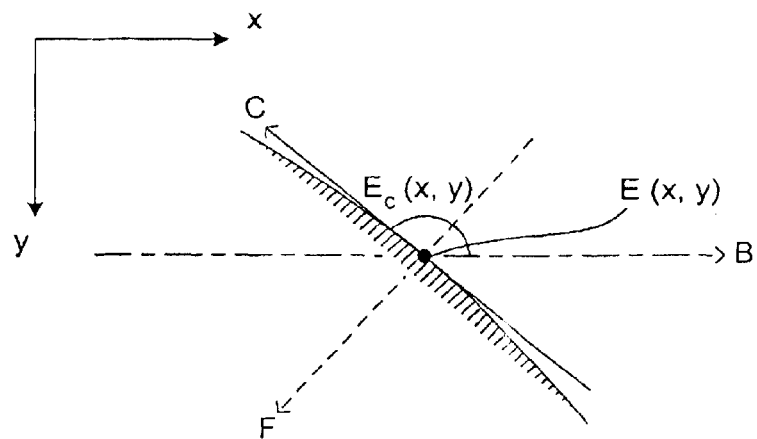
FIG. 4 is a drawing for showing the definition of edge code.

FIG. 4 shows more clearly how an edge code may be represented. In FIG. 4, letter E indicates one of the edge pixels as explained above. Vector F in the direction of a low-density region from a high-density region indicates the direction of the density gradient, and Vector C which is perpendicular to Vector F is defined as the direction of the edge pixel E. FIG. 4 assumes that the target object has a lower density (being darker) than the background. If the target object is lighter than the background, the directions of Vectors F and C will be reversed. In FIG. 4, Vector B is a vector in the +x direction. The angle of rotation in the counter-clockwise direction from Vector B to Vector C is defined as the edge code $Ec(x,y)$ of the edge pixel E.

From the definitions given above, it should be clear that edge code $Ec(x,y)$ and the density gradients $Ex(x,y)$ and $Ey(x,y)$ are related as follows:

$Ec(x,y)=a\tan\{Ey(x,y)/Ex(x,y)\}$ if $Ex(x,y)>0$ and $Ey(x,y)\geq 0$;

$Ec(x,y)=360°+a\tan\{Ey(x,y)/Ex(x,y)\}$ if $Ex(x,y)>0$ and $Ey(x,y)<0$;

$Ec(x,y)=180°+a\tan\{Ey(x,y)/Ex(x,y)\}$ if $Ex(x,y)<0$;

$Ec(x,y)=0°$ if $Ex(x,y)=0$ and $Ey(x,y)>0$; and $Ec(x,y)=180°$ if $Ex(x,y)=0$ and $Ey(x,y)<0$.

A histogram of edge code is created by calculating the edge code $Ec(x,y)$ of each pixel within the area of measurement as explained above and by counting up the frequency value for each edge code. Alternatively, the frequency values weighted with the edge intensity $Ei(x,y)$ of the corresponding pixel may be added up. According to the example being described, the angles on the edge code histogram are set in units of 1° for carrying out digital processing. For removing noise, furthermore, the histogram is smoothed after the calculations at all edge pixels and the addition of frequency numbers are completed.

The creation of the histogram need not be done after the edge pixels are all extracted from the area of measurement. A search may be carried out sequentially within the area of measurement and as soon as an edge pixel is extracted, the calculation of the edge code and the counting up of the frequency number may be effected.

The edge code of each edge pixel forming a line segment on an image should have the same value, representing the slope of the line segment. Thus, if there is a line segment inside the area of measurement, a peak appears near the angle corresponding to the slope of the line segment in the edge code histogram becomes high. If there are a plurality of line segments with different slopes within the area of measurement, a peak appears corresponding to each of the slopes of the line segments.

Figure 5A:
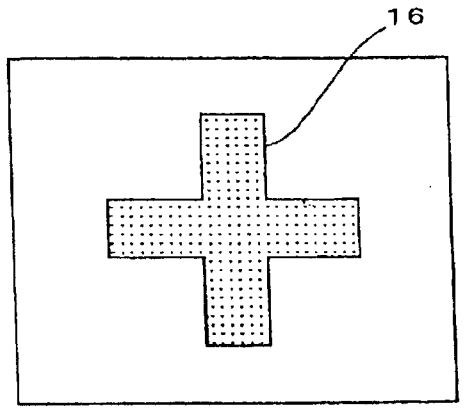
FIG. 5A is an example of variable-density image of a target object and FIG. 5B is an edge code histogram which may be obtained by extracting edge pixels according to a method of this invention.
Figure 5B:
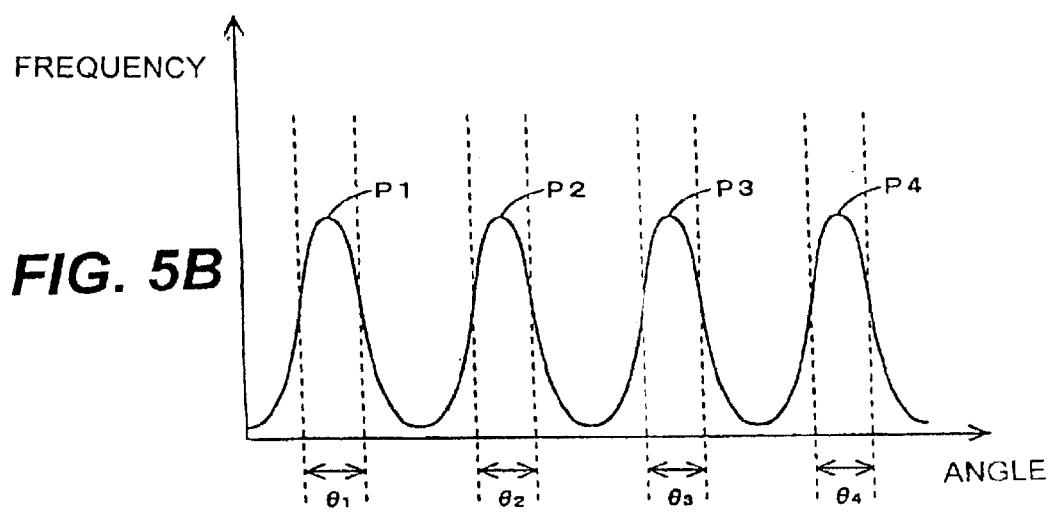

Consider a variable-density image shown in FIG. 5A, for example, with numeral 16 indicating an image of a target object. This is an example of an image with a lower density than the background, the target object having a cross-shaped contour containing line segments in four direction. FIG. 5B is an edge code histogram obtained from the image of FIG. 5A, having four peaks P1–P4 corresponding to the four directions of the line segments contained in the contour image.

In the next step (Step ST3), angles (directions) corresponding to these peaks on the histogram are extracted. This is done by comparing the frequency values at different angles on the histogram from the side of the smaller angles (except the frequency value at edge code of 359° is compared with the frequency value at edge code of 0°) and peaks higher than a specified height are extracted and the angles corresponding to these peaks are identified.

Figure 6A:
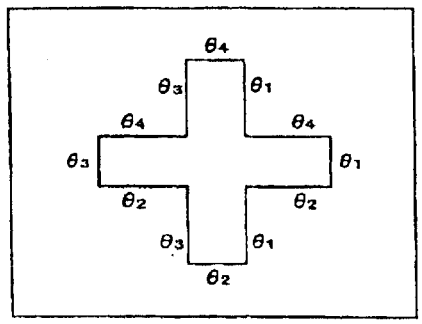
FIGS. 6A and 6B are results of preliminary and final labeling processes, respectively, on the image shown in FIG. 5A.

After the angular positions of the peaks are thus obtained, they are individually labeled (Step ST4), and then these labels are assigned to the edge pixels with edge codes corresponding to these angles (Step ST5). Those of the edge pixels with a edge code which are not labeled and pixels which are not an edge pixel are labeled, for example, as "null" to indicate they are not subject to the processing. It is preferable in Step ST5 to assign the label for a peak not only to the edge pixel having the edge code value corresponding to the top of the associated peak but also to all edge pixels having edge codes that are within a finite range of angles (such as those corresponding to a portion of the histogram with the height exceeding a specified level or within a specified range of angles around the maximum value). In FIG. 5B, after the four peaks P1–P4 have been identified, a range of angles is selected for each of the peaks P1–P4 at which the frequency is relatively high and the angles within these ranges are labeled θ1–θ4. FIG. 6A shows a labeled image thus obtained. In the example illustrated, each of the line segments has one of the labels θ1–θ4 associated with it because each of the edge codes of the edge pixels forming the line segments corresponds to one of the peaks P1–P4.

In the example shown in FIG. 6A, if there are a plurality of line segments in the image corresponding to the same edge code, a same label is assigned to these line segments. Thus, the individual line segments in the image cannot be separated completely by the processing of Step ST5 alone. In Step ST6, therefore, the line segments are relabeled such that different line segments will be assigned different labels. The process in Step ST5 will be hereinafter referred to as the preliminary labeling and the process in Step ST6 as the final labeling process.

In the final labeling process in Step ST6, groups of edge pixels which are continuous and have a same label assigned in the previous preliminary labeling process in Step ST5 are extracted. Different labels are assigned to each of these groups to form another labeled image.

Figure 6B:
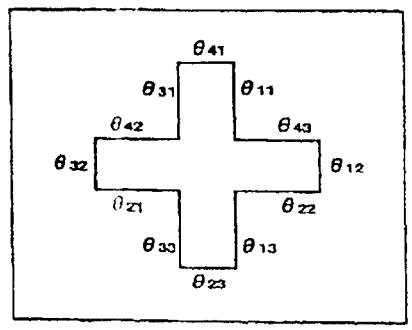

FIG. 6B shows a result of a final labeling process carried out on the labeled image shown in FIG. 6A. The three line segments labeled as θ1 in FIG. 6A are now differently labeled as θ11, θ12 and θ13. Similarly, the three line segments labeled as θ2 in FIG. 6A are now differently labeled as θ21, θ22 and θ23, the three line segments labeled as θ3 in FIG. 6A are now differently labeled as θ31, θ32 and θ33, and the three line segments labeled as θ4 in FIG. 6A are now differently labeled as θ41, θ42 and θ43.

Each line segment can now be labeled differently by such two labeling processes. Each assembly of edge pixels assigned the same label will be hereinafter referred to as the label assembly. In Step ST7, the following calculations (A)–(F) are carried out for each label assembly to obtain characteristics of each line segment. In what follows, $\Sigma$ indicates the summation over all edge pixels within a label assembly, $(x_n, y_n)$ indicates the coordinates of an edge pixel within the label assembly, and $Ei(x_n, y_n)$ and $Ec(x_n, y_n)$ indicate the edge intensity and edge code of the edge pixel positioned at $(x_n, y_n)$.

(A) Center of Density (GX, GY)

The coordinates GX and GY of the center of gravity of each line segment represented by a label assembly are calculated as follows by using the edge intensity $Ei(x_n, y_n)$ of each edge pixel of the label assembly as a weight factor:

$$GX = \Sigma\{Ei(x_n, y_n) x_n\} / \{\Sigma Ei(x_n, y_n)\},$$

$$GY = \Sigma\{Ei(x_n, y_n) y_n\} / \{\Sigma Ei(x_n, y_n)\}.$$

(B) Direction Sums (SCX, SCY)

They are the total sums of the x-components and the y-components of the edge codes of the edge pixels of each label assembly. They are calculated as follows:

$$SCX = \Sigma \cos\{Ec(x_n, y_n)\},$$

$$SCY = \Sigma \sin\{Ec(x_n, y_n)\}.$$

(C) Average Direction (EC)

This characterizes the slope of a line segment represented by a label assembly and may be calculated as follows, depending on the size relationship between SCX and SCY:

$$EC = a\tan(SCY/SCX) \text{ if } SCX > 0 \text{ and } SCY \geq 0,$$

$$EC = 360° + a\tan(SCY/SCX) \text{ if } SCX > 0 \text{ and } SCY < 0,$$

$$EC = 180° + a\tan(SCY/SCX) \text{ if } SCX < 0,$$

$$EC = 0 \text{ if } SCX = 0 \text{ and } SCY > 0,$$

$$EC = 180° \text{ if } SCX = 0 \text{ and } SCY < 0.$$

(D) Equation of Straight Line

This represent a straight line (indicated by letter P in FIG. 7) which passes through the line segment shown by the label assembly and is written as follows in terms of the direction sums and the center of density:

$$(SCY)x + (SCX)y - \{(SCY)(GX) + (SCX)(GY)\} = 0.$$

(E) Coordinates of End Points $((x_1, y_1), (x_2, y_2))$

These are the coordinates of the end points of the line segment. In view of the variations in the measurements, the following calculations are carried out for obtaining the coordinates of the end points which are on the line P. First, the maximum and minimum values of the x-coordinates and the y-coordinates of the edge assembly ($x_{max}$, $y_{max}$, $x_{min}$ and $y_{min}$) are extracted and end points are tentatively placed at $(x'_1, y'_1)$ and $(x'_2, y'_2)$ where $x'_1$ and $x'_2$ are respectively equal to $x_{min}$ and $x_{max}$ but the y-coordinates of the tentatively defined end points are selected such that $y'_1 = y_{min}$ and $y'_2 = y_{max}$ if $(SCY)(SCX) \geq 0$ but that $y'_1 = y_{max}$ and $y'_2 = y_{min}$ if $(SCY)(SCX) < 0$. After the end points are thus determined tentatively, lines passing through these tentatively determined end points and perpendicular to the line P are considered and the points at which these two lines cross the line P are finally defined as the coordinates $(x_1, y_1)$ and $(x_2, y_2)$ of the end points.

(F) Length of Line Segment (L)

This represents the distance between the aforementioned two end points and can be obtained from their coordinates.

Figure 7:
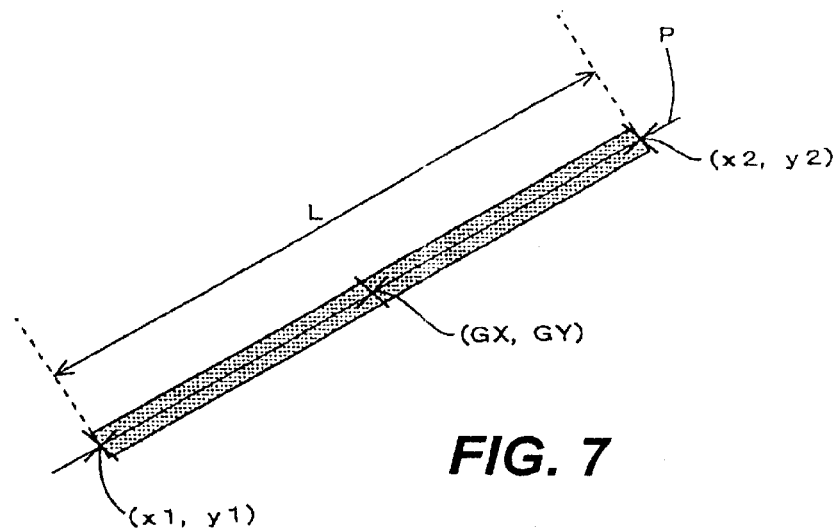
FIG. 7 shows various characteristics of a line segment calculated according to a method of this invention.

Of these characteristic quantities obtained by the calculations (A)–(F), FIG. 7 shows the center of density GX and GY, the straight-line p passing through the line segment, the length L of the line segment and the end points of the line segment $(x_1, y_1)$, $(x_2, y_2)$.

In Step ST8, these characteristic quantities are used to determine whether there are line segments which can be considered to represent one single line segment. If a group of such line segments is discovered, the constituent edge pixels of these segments are gathered together (unified) to form a new label assembly and are assigned a new label.

Moreover, the calculations (A)–(F) are carried out on these newly formed label assemblies. The label assemblies which are thus gathered together, as well as the results of calculations (A)–(F) on them are not erased away but are maintained.

Figure 9:
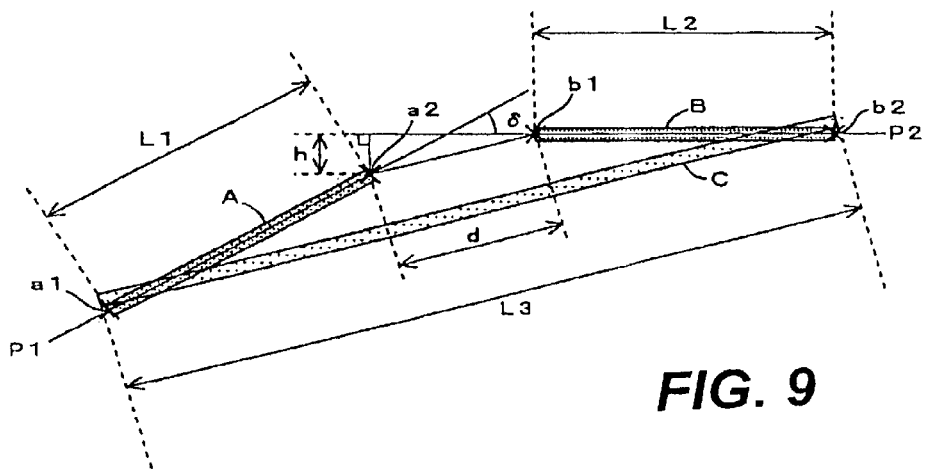
FIG. 9 is a drawing for explaining the parameters used in the routine of FIG. 8.
Figure 8:
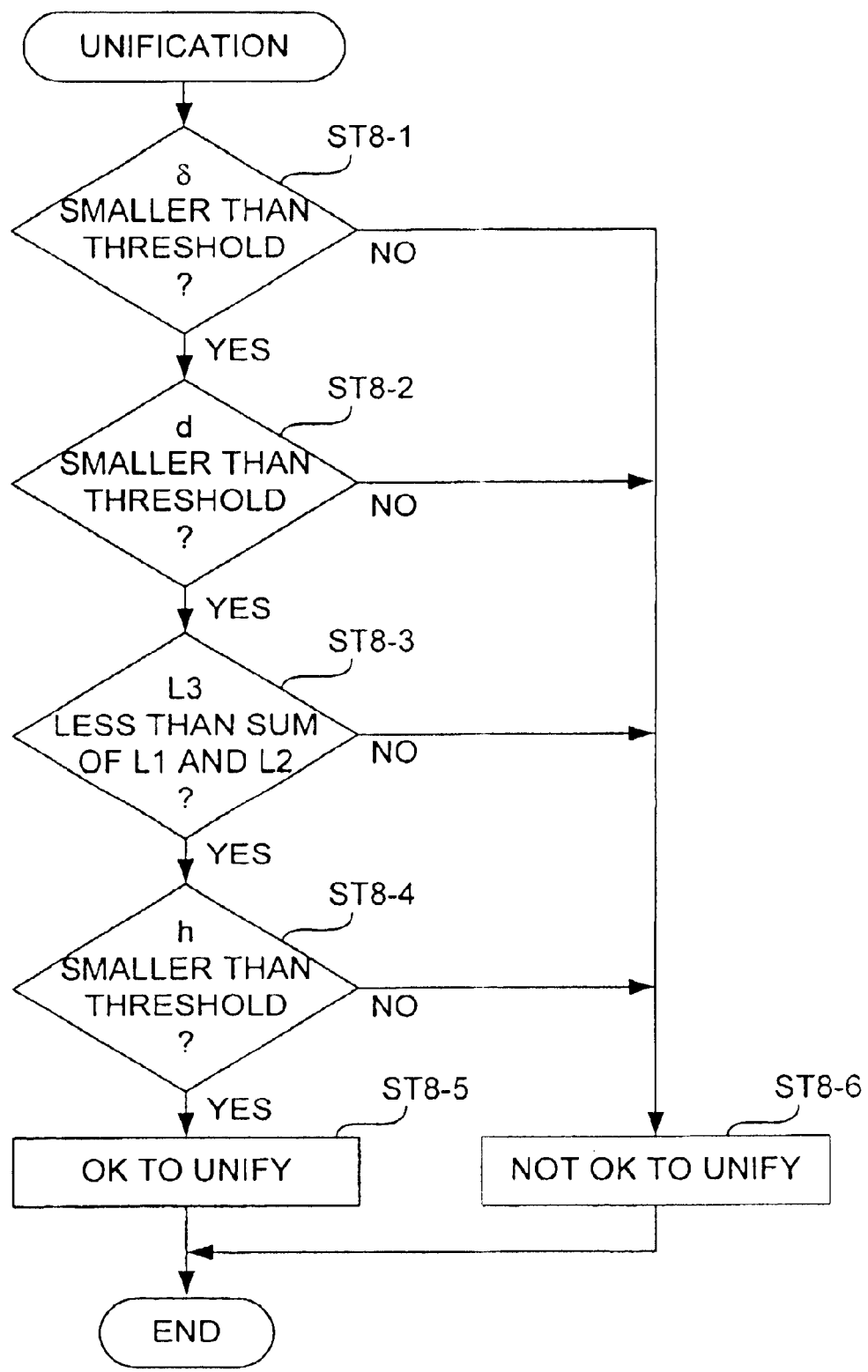
FIG. 8 is a flowchart of a routine for checking whether two line segments can be unified or not.

A program for checking whether such unification of line segments is possible or not will be explained next with reference to FIGS. 8 and 9. In FIG. 9, A and B indicate line segments under consideration, P1 and P2 are straight lines which pass through these line segments A and B, respectively, and C indicates a line segments after line segments A and B have been unified. In order to make it easier to understand the meaning of these parameters, the difference in the orientation and displacement between the line segments A and B are exaggerated in FIG. 9.

This routine is run for every combination of line segments (by two, in this example) within the area of measurement. Let us consider two line segments A and B and check whether or not they can be unified. In Step ST8-1, the slope (or the aforementioned "average direction EC") of each line segment A and B is considered, and it is checked whether their difference δ is smaller than a specified threshold value. Next, it is determined whether the distance d between the two mutually opposite end points of the two line segments A and B (points a2 and b1 in FIG. 9) is smaller than a specified threshold value (Step ST 8-2). Next, the length L3 of the unified line segment C is calculated as the distance between the not mutually oppositely facing end points (a1 and b2 in FIG. 9) of the line segments A and B, and it is checked whether L3 is less than the sum of individual lengths L1 and L2 of the line segments A and B (Step ST8-3). Next, the positional displacement h between the line segments is calculated as the length of the perpendicular line dropped from the closer end point of one of the line segments to the other line segment (such as end point al) from the straight-line passing through the other of the line segments (such as P2), and it is checked whether this positional displacement h is smaller than a specified threshold value (Step ST8-4). If all the values measured in Steps ST8-1 through ST8-4 are less than the corresponding threshold value, it is concluded that the line segments A and B can be unified (Step ST8-5). If any of these measured values is not smaller than the corresponding threshold value, it is concluded that they cannot be unified (Step ST8-6).

Of these threshold values to be specified above, the threshold value to be compared with the distance d between end points may be set fairly large but those to be compared with the difference δ and the displacement h should preferably be set as small as possible. This is because these differences δ and h are expected to be small among line segments obtained from one straight-line portion of the contour of a target object. On the other hand, if there is a large defect on a single straight-line portion and a plurality of line segments are extracted because of such a large defect, the distance d between the mutually facing end points of these line segments is fairly large, and hence the threshold value to be compared with d may be set fairly large.

Figure 10A:
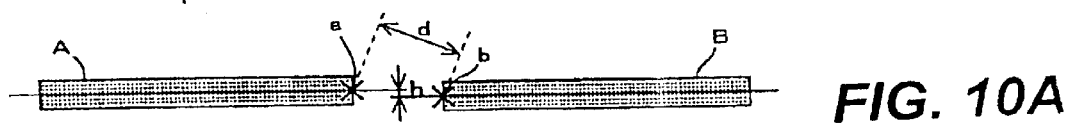
FIGS. 10A and 10B show examples of line segments that may be unified and may not be unified.
Figure 10B:
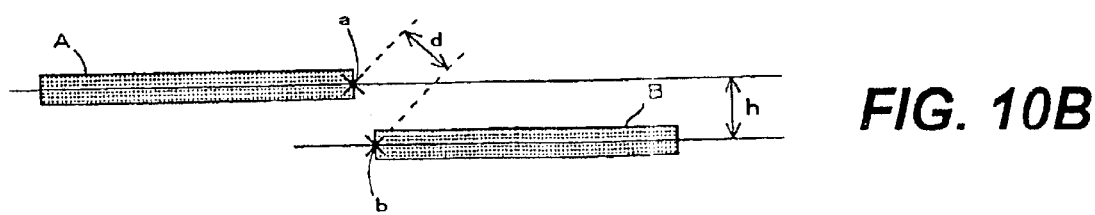

FIGS. 10A and 10B show examples of line segments A and B which can be unified and cannot be unified. In both FIGS. 10A and 10B, there is no difference between the slopes of the two line segments A and B, and although the distance d between their mutually facing end points (a and b) is large, the positional displacement h between the line segments A and B is less than the widths of the line segments in the example of FIG. 10A, and it may be concluded that the line segments A and B may be unified. In the example of FIG. 10B, on the other hand, the distance d between the end points (a and b) is smaller than in FIG. 10A, the positional displacement h exceeds the width of the line segments and hence it is concluded that the line segments A and B cannot be unified.

Figure 11:
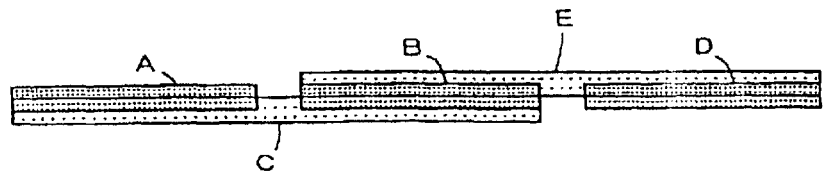
FIG. 11 shows an example of a plurality of line segments which have been unified.

When there are a plurality of pairs of line segments which can be unified, as shown in FIG. 11, the process as described above can be carried out for each of such pairs to obtain a new segment and such newly obtained line segments may further be unified. FIG. 11 shows an example wherein line segments A and B are unified to obtain new line segment C, line segments B and D are unified to obtain new line segment E, and the two newly obtained line segments C and E are unified to obtain a single line segment F. The line segments C, E and F obtained by unification may be assigned different labels but it is preferable to also keep the labels of original labels of the line segments A, B and D.

After the process of individually extracting light segments from an area of measurement and unifying those of the line segments which can be unified, those of the line segments which satisfy certain specified conditions for extraction are extracted (Step ST9 in FIG. 2). A condition for extracting a single line segment such as its length and slope may be selected as the extraction condition but it is preferable to specify a condition for extracting a plurality of line segments for the purpose of measuring the position and orientation of a target object.

Figure 12:
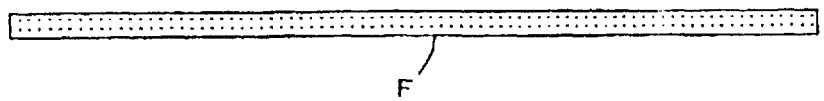
FIG. 12 shows an example of process for extracting line segments.

FIG. 12 shows a method of extracting line segments which form two mutually adjacent sides on the contour of a target object. In this case, too, pairs of line segments within the an area of measurement are sequentially examined and each pair (of line segments A and B) is checked to determine whether the lengths L1 and L2 of the pair of line segments A and B correspond to the side of the target object. If the angle between the line segments is specified as the extraction condition, the angle α between the line segments A and B is obtained from the equations of the straight lines P1 and P2 which pass through the line segments A and B and the angle α thus obtained is compared with the extraction condition.

Figure 13:
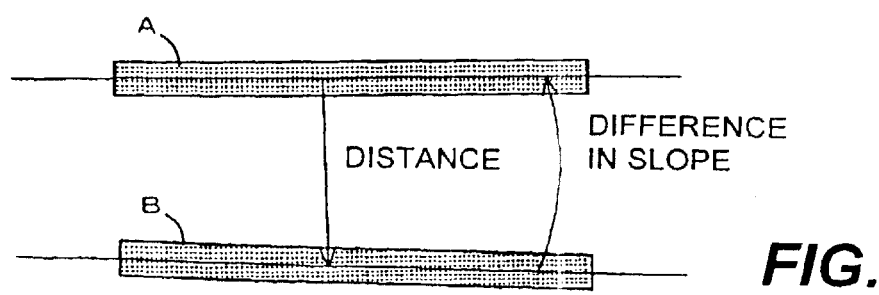
FIG. 13 shows another example of a process for extracting line segments.

FIG. 13 shows another example where the extraction condition requires a pair of parallel line segments to be extracted. In this example, the difference in the slope of the line segments in each pair is obtained and those pairs for which this difference takes a value nearly equal to zero. If the distance between the line segments is also included as a condition for extraction, the distance is calculated from the formulas for the straight lines P1 and P2 passing through the line segments A and B considered to be parallel and this is compared with a given condition. The lengths of the line segments may also be made an extraction condition as in the example explained above with reference to FIG. 12. If the distance between the line segments to be extracted is set extremely small in the method of FIG. 13, even a straight scratch with a very small width can be detected.

Figure 14A:
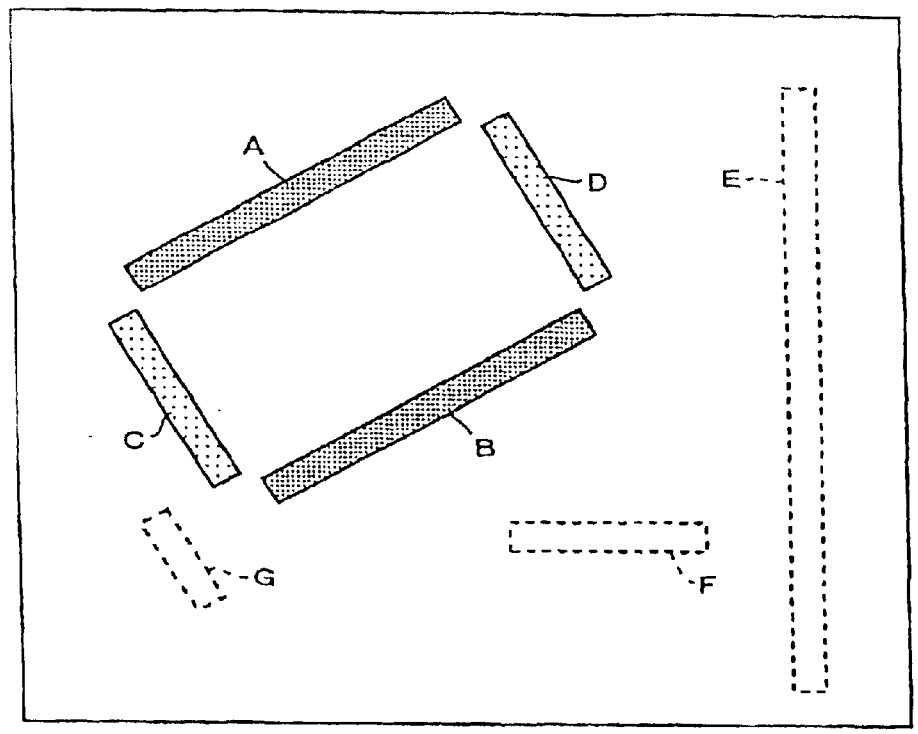
FIGS. 14A and 14B show an example of a process for extracting line segments forming a rectangle.
Figure 14B:
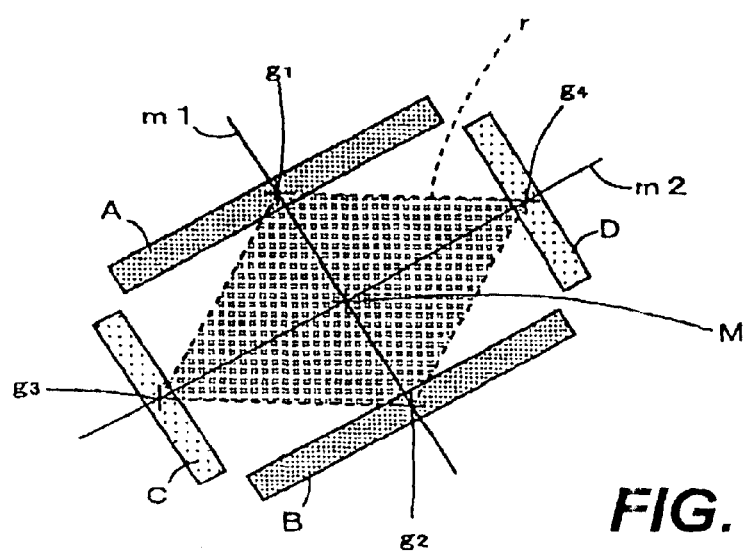

FIGS. 14A and 14B show an example where the requirement is to extract line segments forming a rectangle of a specified size. For this case, two pairs of parallel line segments corresponding to mutually opposite pairs of sides of a rectangle are extracted as shown in FIG. 14A by a pair of line segments A and B and another pair of line segments C and D. The extraction of each pair is carried out as explained above with reference to FIG. 13. Line segments E, F and G are those which did not satisfy the condition of being a parallel line segment.

After it is ascertained that the difference between the slopes of the extracted pairs of line segments is approximately equal to 90°, the region r defined by the lines connecting the centers of weight g1–g4 of the light segments (in the sense of GX and GY) and lines m1 and m2 connecting the center of weight of the pairs of mutually parallel line segments are identified, as shown in FIG. 14B. If the crossing point of the lines m1 and m2 is within the region r, it is concluded that the line segments θ1–θ4 form a rectangle.

After such line segments satisfying specified extraction conditions are extracted, an image for showing the results of this process is generated (Step ST10 in FIG. 2), say, by showing the extracted line segments in a specified color or with a specified level of brightness. The image thus generated is transmitted to the monitor 9 to be displayed. If, as shown in FIG. 12, the point (cx,cy) at which two line segments or two straight lines is obtained from the equations for the straight lines, the image may be formed to indicate such a crossing point by a mark of a specified kind.

Since measurements are made according to this invention by using edge pixels on a variable-density image, errors are not likely to occur by a variation in the brightness of the image due to a different condition of illumination and hence reliable measurements can be expected. Where target objects are likely to vary in size or orientation, the extraction conditions on the lengths and slopes of line segments may be leniently set or use may be made of only other conditions to extract line segments to be analyzed. Thus inspections can be carried out at a high level of accuracy.

The invention has been described only by way of one example but this example is not intended to limit the scope of the invention. Many modifications and variations are possible within the scope of the invention. For example, after line segments forming the contour of a target object have been extracted from an area of measurement, it was simply explained above that the results of the extraction are displayed, but such results may also be used to calculate the position and orientation of the target object. When the target object has a rectangular contour, as shown in FIG. 14A, for example, the position of the target object may be determined by using the equations of the straight lines passing through the extracted line segments A–D to identify an area of measurement and then calculating the position of the center of gravity of this area as representing the position of the target object. The orientation of the target object may be represented in terms of the slope of one of the pairs of the extracted line segments such as the pair of the longer line segments A and B.

Since the processes explained above with reference to FIGS. 8 and 9 can be used to extract contour lines which became separated by a defect on the contour line of a target object, the same processes may be used to detect the presence of a defect on a contour line. If the object of an inspection is simply to determined the presence or absence of a defect, measurements may be preliminarily carried out on a standard object without any defect and an appropriate number of extracted line segments within an area of measurement may be determined. At the time of inspecting a target object, it may simply be checked if the number of extracted line segments obtained from an image to be inspected reaches this preliminarily determined number.

It was shown above to prepare an edge code histogram in anticipation of the possibility that the target object may be erroneously oriented and to extract maximum values corresponding to line segments. If images of target objects can be obtained under a stable condition without erroneous positioning of the target objects, however, the orientation of a contour of a model object on a variable-density image may be preliminarily inputted through an I/O port. Thus, line segments corresponding to this orientation of the contour can be extracted by labeling the edge pixels having edge codes corresponding to the preliminarily determined contour orientation of a target object. It may also be so arranged so as to selectively switch between a processes including the preparation of an edge code histogram and another process not using an edge code histogram.

What is claimed is:

1. A method of processing a variable-density image of a target object having a contour which includes straight-line portions, said image comprising edge pixels representing said contour, said method comprising:

a line labeling step of setting a different one of labels to each of the directions of said straight-line portions;

a pixel labeling step of assigning to those of said edge pixels, which have the same direction as any one of the different directions of said straight-line portions, the same label assigned to said any one different direction; and a line segment extracting step of extracting, as a line segment, an assembly consisting of those of said edge pixels which are continuous on said image and have a same one of said labels assigned thereto, said line labeling step, said pixel labeling step and said line segment extracting step being sequentially carried out.

2. The method of claim 1 wherein said line labeling step includes:

a histogram making step of preparing a histogram from numbers of edge pixels having different directions; and a peak label setting step of extracting peaks from said histogram and setting a different label to each of the directions of edge pixels corresponding to a different one of the extracted peaks;

said histogram making step and said peak label setting step being carried out such that said labels are each set to one of directions of straight-line portions contained in said contour of said target object; and wherein said pixel labeling step comprises the step of assigning each of the different labels set in said peak label setting step to each of the edge pixels having the direction corresponding to the each different label.

3. The method of claim 2 further comprising a unifying step, if the line segments extracted in said line segment extracting step include a pair with a positional displacement smaller than a specified maximum displacement value and a directional difference smaller than a specified maximum directional difference value, of unifying said pair into a single unified segment.

4. The method of claim 2 further comprising a selecting step of selecting, from the extracted line segments in said extracting, those of said line segments satisfying specified line segment selecting conditions.

5. The method of claim 3 further comprising a selecting step of selecting, from the extracted line segments in said extracting step and from the unified line segments in said unifying step, those of said line segments satisfying specified line segment selecting conditions.

6. The method of claim 4 further comprising a display step of distinguishably displaying on said image positions of the line segments selected in said selecting step.

7. The method of claim 5 further comprising a display step of distinguishably displaying on said image positions of the line segments selected in said selecting step.

8. The method of claim 4 further comprising a display step of distinguishably displaying on said image positions of crossing points of extensions of a plurality of the line segments selected in said selecting step.

9. The method of claim 5 further comprising a display step of distinguishably displaying on said image positions of crossing points of extensions of a plurality of the line segments selected in said selecting step.

10. The method of claim 2 further comprising a defect detecting step of determining whether a defect exists or not in straight-line portions of the contour of said target object by examining the line segments extracted in said line segment extracting step.

11. The method of claim 10 wherein it is determined in said defect detecting step, if there is a pair of line segments among the line segments extracted in said line segment extracting step, said pair of line segments having directions of which the difference is within a specified range and having a positional displacement within a specified limit, that there is a defect between said pair of line segments.

12. The method of claim 10 wherein it is determined in said defect detecting step that there is a defect in a straight-line portion of the contour of a target object by comparing the number of line segments extracted in said line segment extracting step with a specified standard value and if said number is different from said specified standard value.

13. The method of claim 1 wherein said line labeling step comprises setting a different one of said labels to each of expected directions of straight-line portions of the contour of said target object and said pixel labeling step comprises assigning said one label to those of the edge pixels having one of said expected directions.

14. The method of claim 13 further comprising a unifying step, if the line segments extracted in said line segment extracting step include a pair with a positional displacement smaller than a specified maximum displacement value and a directional difference smaller than a specified maximum directional difference value, of unifying said pair into a single unified segment.

15. The method of claim 13 further comprising a selecting step of selecting, from the extracted line segments in said extracting, those of said line segments satisfying specified line segment selecting conditions.

16. The method of claim 14 further comprising a selecting step of selecting, from the extracted line segments in said extracting step and from the unified line segments in said unifying step, those of said line segments satisfying specified line segment selecting conditions.

17. The method of claim 13 further comprising a defect detecting step of determining whether a defect exists or not in straight-line portions of the contour of said target object by examining the line segments extracted in said line segment extracting step.

18. An image processing apparatus comprising:
image inputting means for inputting a variable-density image of a target object having a contour;
edge pixel extracting means for extracting edge pixels contained in said image;
orienting means for calculating the directions of said extracted edge pixels;
direction setting means for setting directions of straight-line portions contained in said contour;
line labeling means for setting a different one of labels to each of the directions of said straight-line portions;
pixel labeling means for assigning to those of said edge pixels, which have the same direction as any one of the different directions of said straight-line portions, the same label assigned to said any one different direction; and
line segment extracting means for extracting, as a line segment, an assembly consisting of those of said edge pixels which are continuous on said image and have a same one of said labels assigned thereto.

19. The image processing apparatus of claim 18 wherein said direction setting means comprises:
histogram making means for preparing a histogram from numbers of edge pixels having different directions; and
peak extracting means for extracting peaks from said histogram;
wherein said line labeling means sets a different label to each of the directions of edge pixels corresponding to a different one of the extracted peaks; and
wherein said pixel labeling means assigns each of the different labels set by said line labeling means to each of the edge pixels having the direction corresponding to the each different label.

20. The image processing apparatus of claim 19 further comprising unifying means for serving, if the line segments extracted by the aforementioned line segment extracting means include a pair with a positional displacement smaller than a specified maximum displacement value and a directional difference smaller than a specified maximum directional difference value, to unify said pair into a single unified segment.

21. The image processing apparatus of claim 19 further selecting means for selecting, from the line segments extracted by said line segment extracting, those of said line segments satisfying specified line segment selecting conditions.

22. The image processing apparatus of claim 20 further comprising selecting means for selecting, from the line segments extracted by said line segment extracting means and from the unified line segments unified by said unifying means, those of said line segments satisfying specified line segment selecting conditions.

23. The image processing apparatus of claim 21 further comprising display means for displaying positions of the line segments selected by said selecting means so as to be distinguishable on said image.

24. The image processing apparatus of claim 22 further comprising display means for displaying positions of the line segments selected by said selecting means so as to be distinguishable on said image.

25. The image processing apparatus of claim 21 further comprising display means for distinguishably displaying on said image positions of crossing points of extensions of a plurality of the line segments selected by said selecting means.

26. The image processing apparatus of claim 22 further comprising display means for distinguishably displaying on said image positions of crossing points of extensions of a plurality of the line segments selected by said selecting.

27. The image processing apparatus of claim 18 further comprising defect detecting means for determining whether a defect exists or not in straight-line portions of the contour of said target object by examining the line segments extracted by said line segment extracting means.

28. The image processing apparatus of claim 27 wherein said defect detecting means determines, if there is a pair of line segments among the line segments extracted by said line segment extracting means, said pair of line segments having directions of which the difference is within a specified range and having a positional displacement within a specified limit, that there is a defect between said pair of line segments.

29. The image processing apparatus of claim 27 wherein said defect detecting means determines that there is a defect in a straight-line portion of the contour of a target object by comparing the number of line segments extracted by said line segment extracting means with a specified standard value and if said number is different from said specified standard value.

30. The image processing apparatus of claim 18 wherein said direction setting means inputs expected directions of the straight-line portions of the contour of said target object, said line labeling means sets a different one of said labels to each of the expected directions inputted by direction setting means, and said pixel labeling means assigns said labels to those of the edge pixels having one of the expected directions inputted by said direction setting means.

31. The image processing apparatus of claim 30 further comprising unifying means for serving, if the line segments extracted by said line segment extracting means include a pair with a positional displacement smaller than a specified maximum displacement value and a directional difference smaller than a specified maximum directional difference value, to unify said pair into a single unified segment.

32. The image processing apparatus of claim 30 further comprising selecting means for selecting, from the line segments extracted by said line segment extracting means, those of said line segments satisfying specified condition.

33. The image processing apparatus of claim 31 further comprising selecting means for selecting, from the line segments extracted by said line segment extracting means and from the unified line segments in said unifying means, those of said line segments satisfying specified condition.

34. The image processing apparatus of claim 30 further comprising defect detecting means for determining whether a defect exists or not in straight-line portions of the contour of said target object by examining the line segments extracted by said line segment extracting means.

* * * * *